US009259077B2

(12) United States Patent
Murphy et al.

(10) Patent No.: US 9,259,077 B2
(45) Date of Patent: Feb. 16, 2016

(54) ELASTIC SECURING APPARATUS AND MOUNTING SYSTEM FOR ELECTRONIC DEVICE

(71) Applicant: Johnny Rhymes with Connie, LLC, Roseville, MN (US)

(72) Inventors: John A Murphy, Roseville, MN (US); Connie R Rutledge, Roseville, MN (US)

(73) Assignee: Johnny Rhymes with Connie, LLC, Roseville, MN (US)

( * ) Notice: Subject to any disclaimer, the term of this patent is extended or adjusted under 35 U.S.C. 154(b) by 0 days.

(21) Appl. No.: 14/836,766

(22) Filed: Aug. 26, 2015

(65) Prior Publication Data

US 2015/0365125 A1    Dec. 17, 2015

Related U.S. Application Data

(63) Continuation-in-part of application No. 14/251,146, filed on Apr. 11, 2014, which is a continuation-in-part of application No. 29/453,073, filed on Apr. 24, 2013, now Pat. No. Des. 735,695, which is a continuation of application No. 13/481,581, filed on May 25, 2012, now abandoned.

(60) Provisional application No. 61/490,516, filed on May 26, 2011.

(51) Int. Cl.
*A45F 5/00* (2006.01)

(52) U.S. Cl.
CPC ........... *A45F 5/00* (2013.01); *A45F 2200/0516* (2013.01)

(58) Field of Classification Search
CPC ................ A45F 5/00; A45F 2005/008; A45F 2005/0516; A45F 2005/0525
USPC ......................................... 224/217–219, 930
See application file for complete search history.

(56) References Cited

U.S. PATENT DOCUMENTS

| 1,689,787 | A | | 10/1928 | Kupferschmid |
| 2,283,988 | A | * | 5/1942 | Heath ...................... A47K 5/05 294/119.1 |
| 6,266,685 | B1 | | 7/2001 | Danielson et al. |
| 6,360,928 | B1 | * | 3/2002 | Russo ...................... A45F 5/00 224/218 |
| 7,464,814 | B2 | | 12/2008 | Carnevali |
| 7,780,047 | B2 | | 8/2010 | Chen et al. |
| D633,504 | S | | 3/2011 | Alexander, Jr. |

(Continued)

OTHER PUBLICATIONS

Flygrip, Inc.; Flygrip; product launched summer 2011; accessed Aug. 27, 2012, at http://flygrip.com/.

(Continued)

*Primary Examiner* — Brian D Nash
*Assistant Examiner* — Corey Skurdal
(74) *Attorney, Agent, or Firm* — Adams Grumbles, LLP; Brittany Nanzig

(57) ABSTRACT

The present disclosure relates to a system comprising a handle apparatus and mounting system designed for easier and more secure transport of a mobile phone or other handheld electronic device, and wherein an electronic device can be secured to a surface. The handle apparatus includes a flexible strap, a base, and an adhesive. The mounting system includes a mount faceplate, which includes a central hub and two opposing spiral arms, and an attachment apparatus.

7 Claims, 2 Drawing Sheets

(56) References Cited

U.S. PATENT DOCUMENTS

| | | | |
|---|---|---|---|
| D642,579 S | 8/2011 | Deutsch | |
| 8,428,664 B1* | 4/2013 | Wyers | H04M 1/185 455/575.1 |
| 8,676,279 B2* | 3/2014 | McCurdy | A45F 5/00 455/575.6 |
| 8,746,448 B1* | 6/2014 | Bellace | A45F 5/00 206/320 |
| 8,939,483 B2* | 1/2015 | Kim | H04B 1/385 224/217 |
| 2003/0066856 A1 | 4/2003 | Lehtonen | |
| 2004/0013279 A1 | 1/2004 | Takeda | |
| 2005/0205623 A1* | 9/2005 | Buntain | A45F 5/00 224/217 |
| 2006/0054704 A1 | 3/2006 | Fitch et al. | |
| 2007/0181620 A1* | 8/2007 | Carver | A44C 9/0053 224/217 |
| 2008/0083797 A1 | 4/2008 | Myers | |
| 2008/0203127 A1 | 8/2008 | Castillo-Garrison | |
| 2009/0090750 A1* | 4/2009 | Alcenat | A45F 5/00 224/101 |
| 2009/0321483 A1 | 12/2009 | Froloff | |
| 2010/0116387 A1 | 5/2010 | Channey et al. | |
| 2010/0171021 A1 | 7/2010 | Smith | |
| 2010/0222118 A1* | 9/2010 | Interdanato | H04B 1/385 455/575.6 |
| 2010/0264182 A1 | 10/2010 | Perlman et al. | |
| 2011/0034221 A1 | 2/2011 | Hung et al. | |
| 2011/0266316 A1* | 11/2011 | Ghalib | A45F 5/00 224/217 |
| 2012/0031937 A1* | 2/2012 | Baker | A45C 11/00 224/217 |
| 2012/0048873 A1* | 3/2012 | Hyseni | A45F 5/00 220/752 |
| 2012/0063066 A1* | 3/2012 | Floit | A45F 3/14 361/679.01 |
| 2013/0009413 A1* | 1/2013 | Chiu, Jr. | A45F 5/021 294/142 |

OTHER PUBLICATIONS

Scott Paul Technologies; CellHandle Innovative Phone Accessory; CellHandle; May 16, 2011; accessed Aug. 27, 2012, at http://www.scottpaultech.com/index.html.

Kernelope Enterprises, LLC; Lazy-Hands Thumbs-Free Grip for Mobile Devices; May 2011; access Aug. 27, 2012, at http://www.lazy-hands.com/.

Stephen A Vu; Non-Final Office Action for U.S. Appl. No. 13/481,581; USPTO Communication; Jan. 24, 2013.

Corey Nelson Skurdal; Non-Final Office Action for U.S. Appl. No. 14/251,146; USPTO Communication; Sep. 25, 2014.

Corey Nelson Skurdal; Final Office Action for U.S. Appl. No. 14/251,146; USPTO Communication; Mar. 26, 2015.

* cited by examiner

ELASTIC SECURING APPARATUS AND MOUNTING SYSTEM FOR ELECTRONIC DEVICE

CROSS-REFERENCE TO RELATED APPLICATIONS

This application is a continuation-in-part of U.S. patent application Ser. No. 14/251,146, filed on Apr. 11, 2014, titled FLEXIBLE FINGER STRAP AND SURFACE MOUNT FOR ELECTRONIC DEVICE, which is a continuation-in-part of U.S. patent application Ser. No. 29/453,073, filed on Apr. 24, 2013, titled ELASTIC FINGER STRAP AND BASE, which is a continuation of U.S. patent application Ser. No. 13/481,581, filed May 25, 2012, titled ELASTIC FINGER STRAP AND SURFACE MOUNT FOR ELECTRONIC DEVICE, which claims the benefit of U.S. Provisional Application Ser. No. 61/490,516, filed on May 26, 2011, titled ELASTIC FINGER STRAP AND SURFACE MOUNT FOR ELECTRONIC DEVICE.

BACKGROUND OF THE INVENTION

As smart phone and tablet computers become more prevalent, the need for an ergonomic handle and a convenient, secure way of mounting these devices has become apparent. Millions of dollars are spent on repairs to phones due to accidental damage each year. Many accessories for these devices are designed to protect the device from damage incurred from dropping the device, but few provide the user with a better grip and reduce the likelihood of dropping the device. And none provide both a better grip while in the users hands and a way of firmly securing the device so that the user may operate the device in a "hands-free" fashion.

There are currently several mounting systems available for smartphones. Methods typically employed for securing a phone to a mount include clamps, magnets, or sticky pads. Clamping the phone on edge, between two surfaces, results in limited accessibility to the buttons typically placed around the periphery of the phone, and a portion of the clamp typically protrudes beyond the plain of the screen of the phone, again limiting access to the control screen. Clamps are also limited in the range that they can open and close, making them incompatible with some devices. Clamps also create a physical challenge when engaging a phone that is difficult to overcome with one hand. Magnetic mounts are easier to operate one-handed and with little physical dexterity; however they don't offer a physical capture of the device, which makes it more susceptible to being knocked off the mount by shock or vibration.

Therefore, a complementary accessory and mounting system is needed that enhances a user's grip on an electronic device and that enables a user to connect the device to a mount that physically captures the device and that permits the user to maintain physical dexterity.

FIELD OF THE DISCLOSURE

The present disclosure relates to a system comprising a stick-on apparatus for easier holding and control of handheld devices and an interfacing mounting apparatus for securing the apparatus for "hands-free" use.

SUMMARY

An objective of the present invention is to provide a strong, low-profile, device-agnostic, secure handle apparatus to assist in the holding and use of mobile electronics. The handle can be easy to install directly to a handheld device or to a protective case for said device. The handle can be used ambidextrously and requires little dexterity to use. Further, it is minimally intrusive, adding little to the external dimensions, and it allows the user to store the electronic device in pockets and purses with ease.

In one aspect, the disclosed handle includes a flexible strap that is adhered at both ends to a singular, rigid base that is, in turn, strongly adhered to the back of a handheld electronic device, which provides the user of said device a means to hold the electronic device securely by inserting one or more fingers into the opening between the strap and base.

The strap is flexible enough to allow a user to hold the device in a variety of ways, making it safer as well as more practical and ergonomic to use. The flexible strap is attached to the back side of the base in receiving channels that are approximately as deep as the thickness of the flexible strap such that when the flexible strap is adhered to the base, the surface of the flexible strap is approximately in the same plane of the back of the base, providing a contiguous surface for adhesively bonding the base to the device.

An additional objective of the present invention is to provide a complementary mounting system to the handle, wherein the mounting system interfaces directly with the flexible strap and base of the handle and enables the user to secure the handheld device to a surface for 'hands-free' usage.

In some embodiments, the mount system is comprised of a mount faceplate that interacts with the handle and handheld device and a complementary attachment apparatus that securely fastens the mount faceplate to a variety of surfaces and structures such as, but not limited to, selfie sticks, bicycle handle bars, automobile dashboards, cup holders, or air vents.

DETAILED DESCRIPTION

The exemplary embodiments described herein in detail for illustrative purposes are subject to many variations in structure and design. It should be emphasized, however, that the present disclosure is not limited to a particular strap, base, and mount, as shown and described. It is understood that various omissions and substitutions of equivalents are contemplated as circumstances may suggest or render expedient, but these are intended to cover the application or embodiments without departing from the spirit or scope of the claims of the present disclosure. Also, it is to be understood that the phraseology and terminology used herein are for the purpose of description and should not be regarded as limiting.

The use of "including," "comprising," or "having" and variations thereof herein is meant to encompass the items listed thereafter and equivalents thereof as well as additional items. Further, the terms, "a" and "an" herein do not denote a limitation of quantity, but rather denote the presence of at least one of the referenced item. Unless limited otherwise, the terms "attached," "coupled," and variations thereof herein are used broadly and encompass direct and indirect attachments and couplings.

Figure 1:
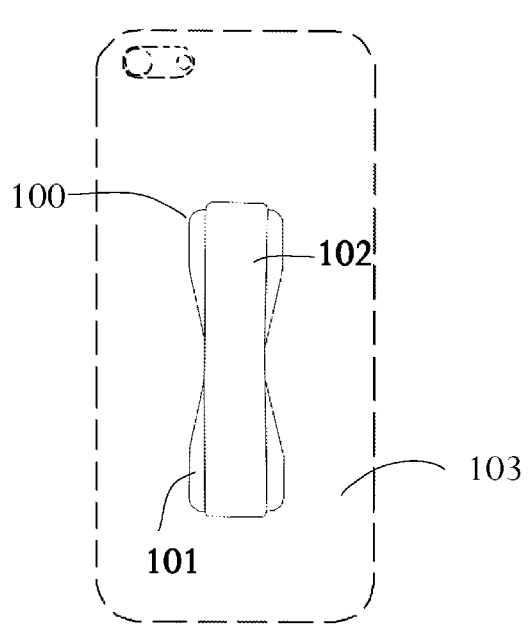
FIG. 1 illustrates a top view of the handle attached to a device according to one embodiment of the present invention.

In one embodiment, as shown in FIG. 1, the disclosed invention includes a sleek, adhesive handle apparatus 100. The disclosed handle 100 includes a flexible strap 102 having two ends that are adhered to the back of a singular, rigid base 101 that is, in turn, strongly adhered to the back of a handheld, electronic device 103. The electronic device 103 provides a user of said device 103 a means to hold the device 103 securely by inserting one or more fingers into an opening between the flexible strap 102 and the base 101.

Figure 2:
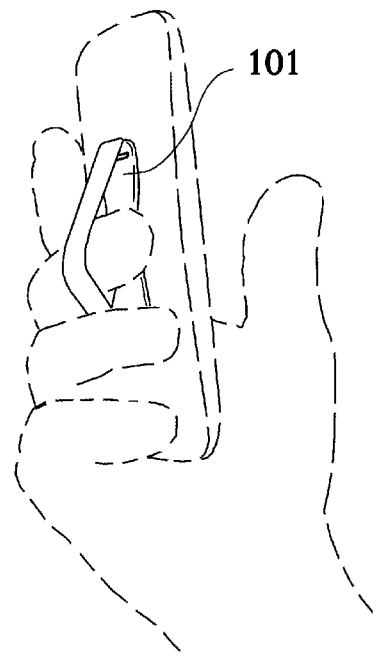
FIG. 2 illustrates a perspective view of the handle of FIG. 1 in use according to one embodiment of the present invention.

FIG. 2 demonstrates use of the handle 100 when the flexible strap 102 and base 101 are attached to an electronic device 103 and held in a user's hand. One or more fingers, as shown in FIG. 2, can be inserted through the aperture created by the flexible strap 102 being firmly attached to both ends of the base 101. The base 101 and flexible strap 102 may be made to different lengths and widths to accommodate different mounting apparatuses or appendages. In some embodiments, the handle 100 may be integrated with the case of the electronic device or the handle 100 may be a protective case for a mobile phone.

Figure 3:
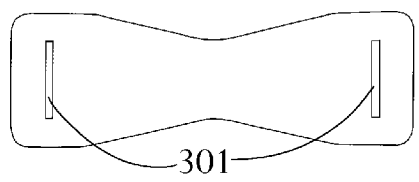
FIG. 3 illustrates a back view of the base according to one embodiment of the present invention.
Figure 4:
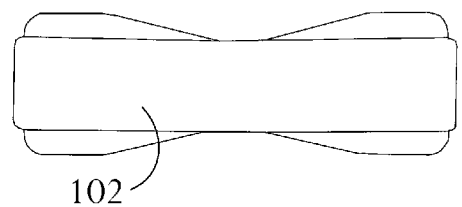
FIG. 4 illustrates a top view of the handle of FIG. 1 according to one embodiment of the present invention.

The base 101 can tautly secure both ends of the flexible strap 102 such that the flexible strap 102 lies substantially flat to the top of the base 101. The base 101 can be wider at both ends to encompass the full width of the flexible strap 102 and, in the middle, can be narrower than the flexible strap 102 such that the edges of the taut, flexible strap 102 are not touching the base 101 but maintain a distance from the back of the electronic device 103 approximately equal to the thickness of the base 101. This gap makes it easy for users to insert fingers between the base 101 and flexible strap 102 or to slide the handle 100 onto a mount with minimal dexterity. Therefore, as described above and illustrated in FIGS. 1, 3-4, and 6, the base 101 narrows at least once in the middle to create the aforementioned gap. For example, the base 101 can take the general shape of a bow tie, wherein a first and second end of the base are wider than the middle. FIG. 3 depicts the hourglass like shape of the base 101 with two mortises 301 that are designed to accept protrusions from a mounting apparatus. The periphery of the base 101 can be tapered to create a sleek look and feel and to facilitate the insertion of fingers or mount.

Figure 5:
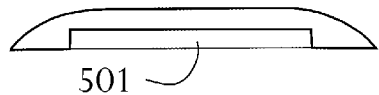
FIG. 5 illustrates a left side view of the base according to one embodiment of the present invention.

The edge of the base 101 is rounded and tapered toward the back surface of the base 101, as shown in FIG. 5, to create a smooth and sleek feel for the user and to prevent the electronic device 103 from becoming caught on clothing, pockets, and the like. The distinctive beveled edge of the base 101, particularly in the narrow portion of the base 101, creates a unique ergonomic grip for the user, such that when the user's finger is inserted between the flexible strap 102 and base 101, and the narrow portion of the base 101 is proximal to one of the user's finger joints, the attached electronic device 103 will not fall from the users hands. The narrowing of the base 101 and tapering of the edge of the base 101 together provide a functional gap between the back of the electronic device 103 and the flexible strap 102 for the effortless insertion of fingers and mounting apparatuses.

In some embodiments, the base 101 can provide a secure anchor for both ends of the flexible strap 102 in the form of receiving channels 501. The receiving channels 501 can be located on the back of the base 101, as depicted in FIGS. 5 and 6 and each end of the flexible strap 102 can adhere to a receiving channel 501.

The back of the base 101 can be strongly secured to the electronic device 103 with a strong, semi-permanent, double-sided adhesive backer that covers a significant portion of the back surface of the base 101. The base 101 can also adhere to the backside of any protective case or other solid surface using the adhesive backer.

The adhesive backer can be a strong, yet removable, adhesive like the VHB family of tapes or other similar adhesives. In other embodiments, the flexible strap 102 and base 101 may be attached by physically engaging an electronic device's protective case or tensioned via buckle, snaps, or by expanding the length of the rigid base 101.

Figure 6:
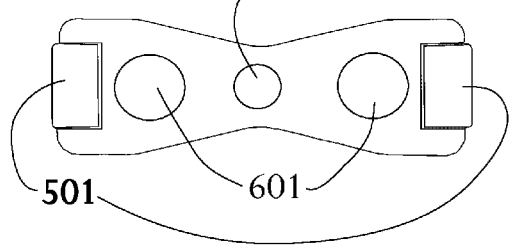
FIG. 6 illustrates a back view of the base according to one embodiment of the present invention.

In one embodiment, the back of the base 101 may have concave recesses 601 at either end of the back of the base 101, as illustrated in FIG. 6. The combination of the adhesive and the concave recesses 601 creates a suction pressure to help adhere the base 101 to electronic devices 103. This suction can help secure the base 101 to device backs that may be difficult for adhesive alone to firmly bond to such as, but not limited to, glass and surfaces with oleophobic coatings.

In one embodiment of the current invention, the base 101 may be comprised of plastic, metal, wood, or any other rigid material. Additionally, the base 101 may be semi-rigid or even flexible.

The rigidity of the base 101 provides a strong surface for dispersing the tension of the flexible strap 102 over a larger area. This dispersal of tension increases tensile strength and prevents the adhesive from failing over time. The rigidity of the base 101 further enables the flexible strap 102 to remain taut before and after being applied to the electronic device 103.

In another embodiment of the current invention, the base 101 can contain an embedded or surface magnet 602, as depicted in FIG. 6. The magnet 602 can assist in positioning and aligning the handle 100 for engagement with a mount apparatus. The base 101 may further have one or more receiving mortises 301 to securely interface with a mount apparatus. In another embodiment, the base 101 may contain embedded circuitry, such as RFID, NFC, or other sensors or microelectronic chips, to enable the handle 100 to communicate with other devices, act as a bio-monitoring device, or activate lights. The base 101 may be comprised of clear plastic material allowing any lights in the base 101 to be viewable from the back or to show graphics printed on the back of the base 101.

The flexible strap 102 can be made of an elastic fabric material, though it may be comprised of rubber or a similar elastomeric material. In the case of rubber, the flexible strap 102 could provide additional friction for secure handling of an electronic device 103. The flexible strap 102 is stretchable enough to allow a user's fingers to be inserted between the flexible strap 102 and a base 101 for easier holding and control of the electronic device 103 to which the base 101 is attached. The flexible strap 102 can be permanently or removably secured to the base 101 at both ends and attached in such a way that it is held taut against the base 101. The flexible strap 102 may be printed upon with text or graphics in some embodiments. The width of the flexible strap 102 may vary, though it will always be wider than the narrow portion of the base 101. The flexible strap 102 may have a loop, button hole, or grommet to attach lanyards or trinkets.

In some embodiments, the disclosed invention further includes a complementary mounting system to the handle 100, wherein the mounting system interfaces directly with the flexible strap 102 and base 101 and enables the user to secure the electronic device 103 to a surface for hands-free usage.

Figure 10:
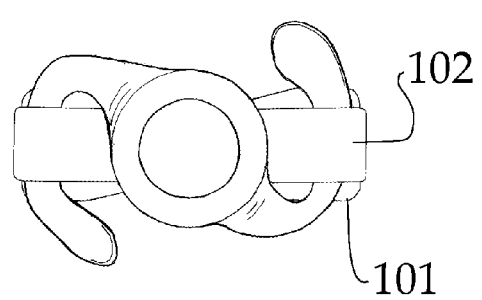
FIG. 10 illustrates the handle of FIG. 1 connected to the mount faceplate of FIG. 7 according to one embodiment of the present invention.

The mounting system can be comprised of a mount faceplate 703 that interacts with the handle 100 and electronic device 103 and an attachment apparatus. The attachment apparatus can securely fasten the mount faceplate 703 to a variety of surfaces and structures such as, but not limited to, selfie sticks, bicycle handle bars, automobile dashboards, cup holders, or air vents. FIGS. 7-10 illustrate one embodiment of a complementary mount faceplate 703. As illustrated in FIG. 10, the mount faceplate 703 can interface with the flexible strap 102 and base 101, providing a simple and secure method of storage for electronic devices 103.

Figure 7:
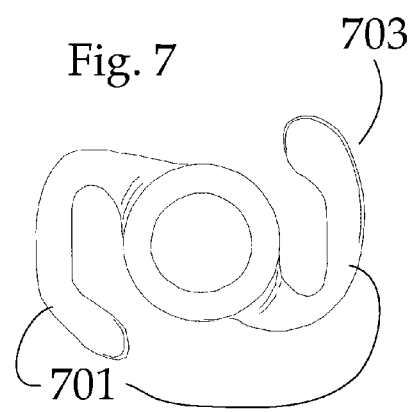
FIG. 7 illustrates a back view of a mount faceplate apparatus according to one embodiment of the present invention.
Figure 8:
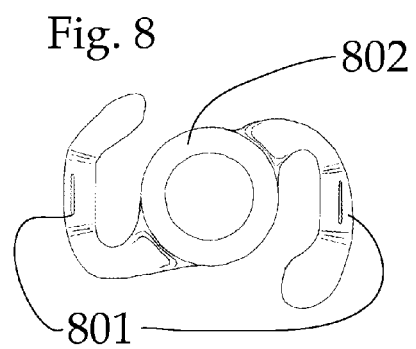
FIG. 8 illustrates a front view of the mount faceplate apparatus of FIG. 7 according to one embodiment of the present invention.
Figure 9:
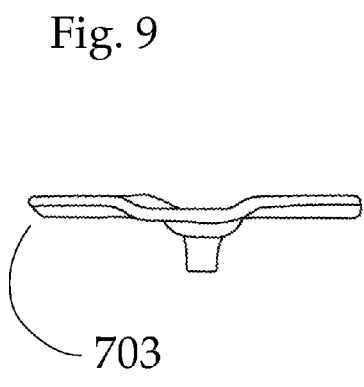
FIG. 9 illustrates a side view of the mount faceplate of FIG. 7 according to one embodiment of the present invention.

In one embodiment of the current invention, the mount faceplate 703 is comprised of a central hub 802 and two arms 701, as illustrated in FIGS. 7 and 8, wherein FIG. 7 illustrates the front of the mount faceplate 703 and FIG. 8 illustrates the back of the mount faceplate 703. More specifically, in one embodiment of the invention, the mount faceplate 703 has two counter spiraling arms 701 that extend from a central hub 802 and that are shaped to fit the contour of the base 101, as illustrated in FIG. 10. The arms 701 of the mount faceplate 703 can be spaced apart such that the flexible strap 102 fits between the arms 701 when engaging the handle 100 with the mount faceplate 703.

To secure the handle 100 to the mount faceplate 703, the handle 100 can be slid on to the mount faceplate 703 or aligned with the mount faceplate 703 and rotated by 90 degrees to interlock with the mount faceplate 703. As the handle 100 is rotated, the arms 701 can slide between the flexible strap 102 and base 101 and form a locked position. The elasticity of the flexible strap 102 holds the arms 701 tight to the base 101. Further, there are recesses 801 on each arm 701 that complement and receive the base 101 when it is fully rotated into locking position. The recesses 801 can be inset such that the back of the attached electronic device 103 comes into contact with the mount faceplate 703 when fully engaged.

In some embodiments, the arms 701 may also have a protruding tenon that fits into a mortise of the base 101 to provide further stability when engaged. In other embodiments, the mount faceplate 703 can have protrusions on either arm that fit securely in recesses 301 on the base 101 to securely hold and align handle 100 and the attached electronic device 103. The protrusions may be a variety of shapes and positions relative to the mount faceplate 703.

In some embodiments, the central hub 802 has at its center a strong magnet that assists in aligning the handle 100 with the mount faceplate 703 so that the user may feel the correct alignment position without having to closely observe the procedure. The back of the central hub 802 can connect to various attachment apparatuses that securely fasten the mount faceplate 703 to a variety of surfaces and structures, which, in turn, connect to various adaptors. The attachment apparatuses may attach to a solid surface, article of clothing, vehicle interior, handbag, or luggage, among other things.

In another embodiment, the mount faceplate 703 is comprised of a singular arm that extends from the central hub 802. In this arrangement, the handle 100 can slide on to the mount faceplate 703 from one direction to nest in the recess 801. The singular arm can be shaped to easily fit in the gap created by the base 101 and flexible strap 102 by having an edge radius that is less than half of the distance of the gap. In some embodiments, the singular arm can be shaped to receive the narrow portion of the base 101 when inserted between the flexible strap 102 and the base 101. In other embodiments, the singular arm can be shaped to receive a portion of the base 101 such the base 101 nests into the arm. The singular arm may have a magnet located at the receiving portion to assist in the tactile locating of the mount faceplate 703 and to assist in securing the handle 100 to the mount faceplate 703. The singular arm faceplate can attach to a variety of complementary attachment apparatuses of standard design.

What is claimed is:

1. A handle apparatus that facilitates holding an electronic device comprising:
   a flexible strap having a first end and a second end and comprised of an elastic material; and
   a rigid base, the rigid base comprising:
      a first end;
      a midpoint;
      a second end;
      a back surface;
      a front surface;
      a periphery;
      an adhesive backer covering the back surface;
      a first receiving channel on the back surface near the first end;
      a second receiving channel on the back surface near the second end;
      a first receiving mortise near the first end; and
      a second receiving mortise near the second end;
   wherein:
      the periphery of the base is tapered;
      the first end of the flexible strap is secured to the first receiving channel of the rigid base;
      the second end of the flexible strap is secured to the second receiving channel of the rigid base;
      the first end of the rigid base and the second end of the rigid base are wider than the midpoint of the rigid base;
      the first end of the rigid base and the second end of the rigid base encompass the full width of the flexible strap;
      the flexible strap is wider than the midpoint of the rigid base; and
      the flexible strap runs along the front surface of the rigid base.

2. The handle apparatus of claim 1, wherein the first end and the second end are of equal width.

3. The handle apparatus of claim 1, wherein the first channel and the second channel are wider than the flexible strap.

4. The handle apparatus of claim 1, wherein the adhesive backer matches the shape of the rigid base.

5. The handle apparatus of claim 1, wherein the rigid base has a first concave recess on the back surface near the first end and a second concave recess on the back surface near the second end.

6. The handle apparatus of claim 1, wherein the rigid base is further comprised of a magnet on the back surface near the midpoint.

7. The handle apparatus of claim 1, wherein the rigid base contains an embedded magnet near the midpoint.

* * * * *